(No Model.)   2 Sheets—Sheet 1.

E. F. PERKINS & G. D. BURTON.
STOCK CAR.

No. 310,463.  Patented Jan. 6, 1885.

WITNESSES
John H Butler
James Dana

INVENTORS.
E. F. Perkins
Geo. D. Burton (No Model.) 2 Sheets—Sheet 2.
E. F. PERKINS & G. D. BURTON.
STOCK CAR.
No. 310,463. Patented Jan. 6, 1885.
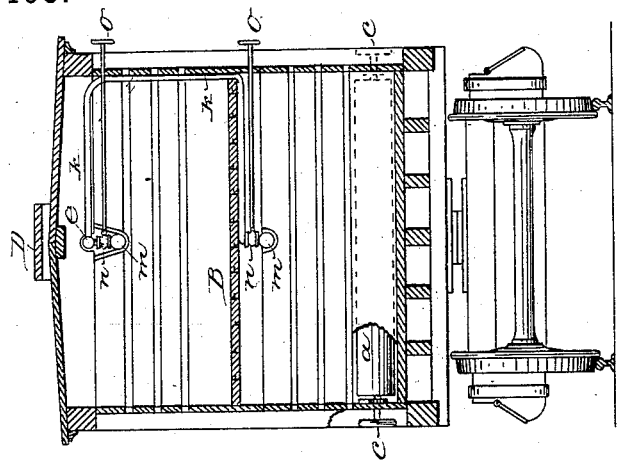
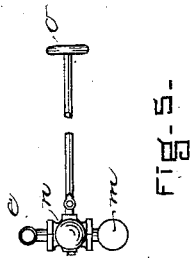
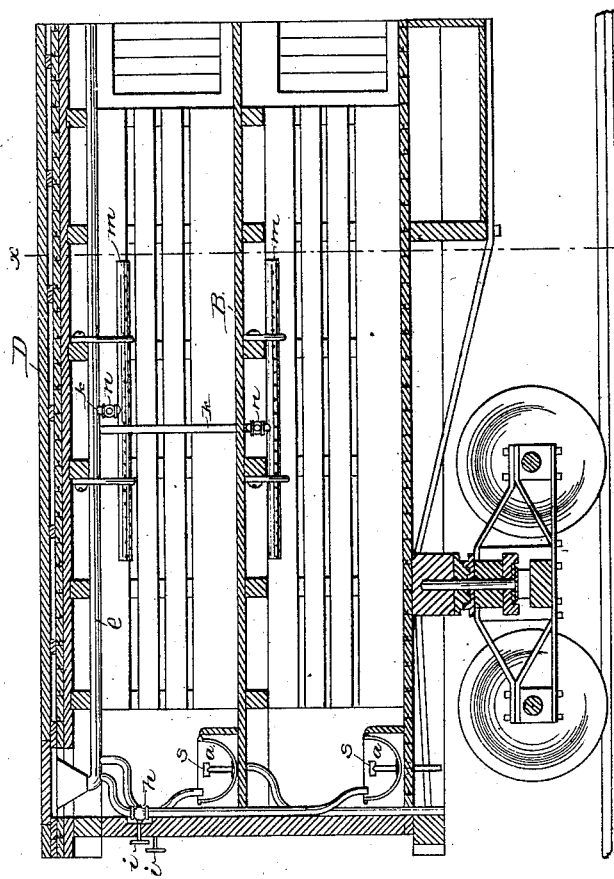
WITNESSES
James Dana
John H. Butler
INVENTORS.
E. F. Perkins
Geo. D. Burton

UNITED STATES PATENT OFFICE.

EDWIN F. PERKINS AND GEORGE D. BURTON, OF BOSTON, MASS.

STOCK-CAR.

SPECIFICATION forming part of Letters Patent No. 310,463, dated January 6, 1885.

Application filed February 8, 1884. (No model.)

*To all whom it may concern:*

Be it known that we, EDWIN F. PERKINS and GEORGE D. BURTON, of Boston, county of Suffolk, and State of Massachusetts, have invented an Improvement in Stock-Cars, of which the following description, in connection with the accompanying drawings, is a specification, like letters on the drawings representing like parts.

Our invention relates to a stock-car especially adapted for transporting small animals, such as sheep and hogs, and has for its main object to provide for the comfort of the animals in hot weather.

The invention is shown embodied in a car provided with two floors—one above the other—forming two compartments, each having troughs for feeding and watering the animals. The car is provided at its top with a water-pipe having one or more funnel-shaped mouths to receive water from the usual water-cranes, and having branches extending to the different troughs, the said branches being provided with valves to control the flow of water through them, and the main water-pipe being also connected with sprinkling devices, by which a spray or shower of water may be thrown upon the animals to cool and wash them in hot weather.

Figure 1:
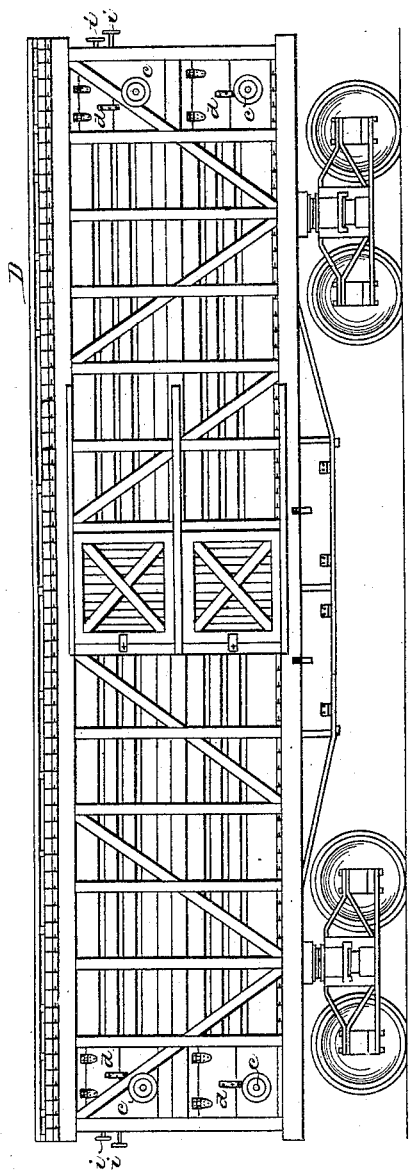
Figure 2:
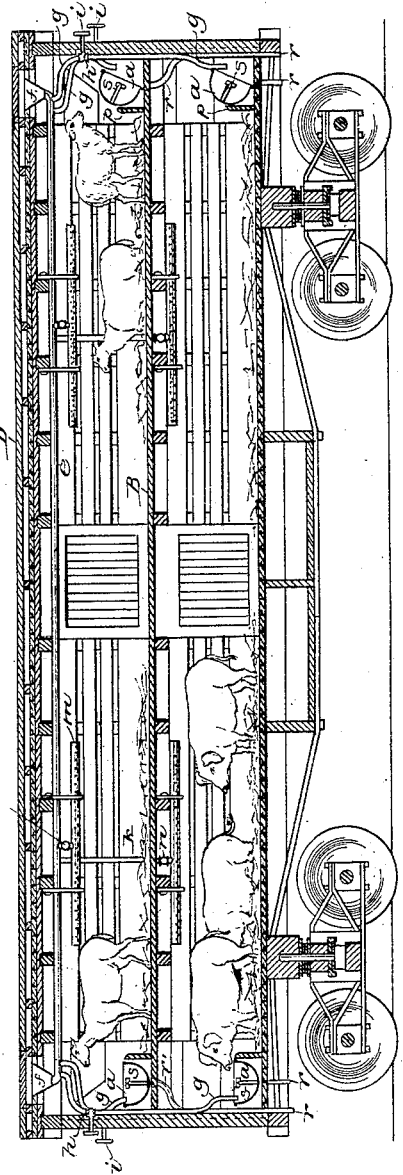

Figure 1 is a side elevation of a stock-car embodying this invention; Fig. 2, a longitudinal section thereof; Fig. 3, a partial longitudinal section on a larger scale; Fig. 4, a transverse section on line $x\,x$, Fig. 3; and Fig. 5 a detail to be referred to.

The car-body, of any suitable or usual construction, is shown in this instance as provided with an intermediate floor, B, dividing the car into two stories or compartments— one above the other—each of which is provided with one or more independent troughs, $a$, preferably rounded or semi-cylindrical in shape, and pivoted, so that they may be turned part way over, as shown at the right hand in Fig. 2, thus preventing the animals from climbing into them and being injured when the said troughs are not in use for feeding them. The said troughs $a$ are provided with suitable hand-wheels to enable them to be turned from the outside of the car, and doors $d$ are provided to afford access to the said troughs from the outside of the car. A water-pipe, $e$, located beneath the roof or top of the car, is provided with funnel-shaped mouths $f$, opening beneath the foot-board E, at the top of the car, to receive water from the usual pipes employed for supplying locomotives. The pipe $e$ has branches $g$ leading to the different troughs $a$, the said branches being provided with valves $h$, operated by suitable handles, $i$, at the outside of the car, to control the flow of water from the pipe $e$ to the different troughs. The pipe $e$ is also provided with branches $k$, leading to sprinklers $m$, shown as perforated pipes arranged along the top of the compartments of the car, the admission of water to the said sprinklers being controlled by valves $n$, (see Fig. 5,) operated by handles $o$ at the outside of the car. Thus by closing the valves $h$ and opening the valves $n$ the water admitted to the pipe $e$ may be caused to pass downward to the sprinklers $m$ and be distributed in the form of spray over the animals in the car below, thus affording great relief to the animals in hot weather and preventing the injury arising from long exposure to the sun. The feed-troughs $a$ are placed in small compartments separated by partitions from the remainder of the car, and the space below them is provided with waste-pipes $r$, for carrying off the unused water from the said feed-troughs, which are provided with removable overflow-plugs $s$.

We claim—

A stock-car provided with the water-pipe $e$, extending along its top, said pipe having the funnel-shape supply-openings $f$, and branch pipes $k$, leading to sprinklers $m$, located within the car, and branch pipes $g$, leading to troughs $a$, combined with valves in said branch pipes, the handles or turning-plugs of which valves are located without the car, all arranged substantially as shown and described.

In testimony whereof we have signed our names to this specification in the presence of two subscribing witnesses.

EDWIN F. PERKINS.
GEO. D. BURTON.

Witnesses:
JOEL M. HOLDON,
JAMES L. BOLSTER.